United States Patent
Palmer et al.

(10) Patent No.: US 11,704,287 B2
(45) Date of Patent: *Jul. 18, 2023

(54) WEB APPLICATION OPEN PLATFORM INTERFACE (WOPI) SERVER ARCHITECTURE AND APPLICATIONS FOR DISTRIBUTED NETWORK COMPUTING ENVIRONMENTS

(71) Applicant: Open Text SA ULC, Halifax (CA)

(72) Inventors: Jody Hupton Palmer, Cambridge (CA); Gary Clayton Cowan, Tallahassee, FL (US); Robert David James Reynolds, Kitchener (CA)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/876,671

(22) Filed: Jul. 29, 2022

(65) Prior Publication Data
US 2022/0382718 A1     Dec. 1, 2022

Related U.S. Application Data

(63) Continuation of application No. 16/871,612, filed on May 11, 2020, now Pat. No. 11,442,901, which is a (Continued)

(51) Int. Cl.
*G06F 16/176* (2019.01)
*H04L 9/40* (2022.01)
(Continued)

(52) U.S. Cl.
CPC ........ *G06F 16/1774* (2019.01); *G06F 16/178* (2019.01); *G06F 16/93* (2019.01);
(Continued)

(58) Field of Classification Search
CPC .... G06F 16/1774; G06F 16/93; G06F 16/178; G06Q 10/101; H04L 67/06; H04L 63/10; H04L 67/02
See application file for complete search history.

(56) References Cited

U.S. PATENT DOCUMENTS

| | | | |
|---|---|---|---|
| 2013/0080785 A1* | 3/2013 | Ruhlen | .......... H04L 67/51 713/176 |
| 2018/0124068 A1* | 5/2018 | Ruhlen | .......... H04L 67/60 |

OTHER PUBLICATIONS

Microsoft Corporation, Web Application Open Platform Interface Protocol, Oct. 17, 2016, v20161017 (Year: 2016).*

* cited by examiner

*Primary Examiner* — Wing F Chan
*Assistant Examiner* — Billy H Ng
(74) *Attorney, Agent, or Firm* — Sprinkle IP Law Group

(57) ABSTRACT

An interface server (e.g., Web Application Open Platform Interface (WOPI) server) is communicatively connected to an information management (IM) server and to an online application server which acts as a client of the interface server. When a user wishes to open, create, or edit a document in an online application hosted by the online application server, the interface server is called, instead of the IM server which manages the document at the backend of an enterprise computing network. The interface server is configured for obtaining a working copy of the document from the IM server and providing the working copy to the client. The client provides the working copy to the online application for display on the user device. When the work is done, the working copy is sync'd back through the interface server to the IM server as a new draft and deleted by the interface server.

20 Claims, 9 Drawing Sheets

Related U.S. Application Data continuation of application No. 15/884,078, filed on Jan. 30, 2018, now Pat. No. 10,671,570.

(60) Provisional application No. 62/453,342, filed on Feb. 1, 2017.

(51) Int. Cl.
*G06F 16/93* (2019.01)
*G06F 16/178* (2019.01)
*H04L 67/06* (2022.01)
*G06Q 10/101* (2023.01)
*H04L 67/02* (2022.01)
*H04L 67/01* (2022.01)
*H04L 67/56* (2022.01)

(52) U.S. Cl.
CPC ....... *G06Q 10/101* (2013.01); *H04L 63/0869* (2013.01); *H04L 67/06* (2013.01); *H04L 63/0807* (2013.01); *H04L 63/10* (2013.01); *H04L 67/01* (2022.05); *H04L 67/02* (2013.01); *H04L 67/56* (2022.05)

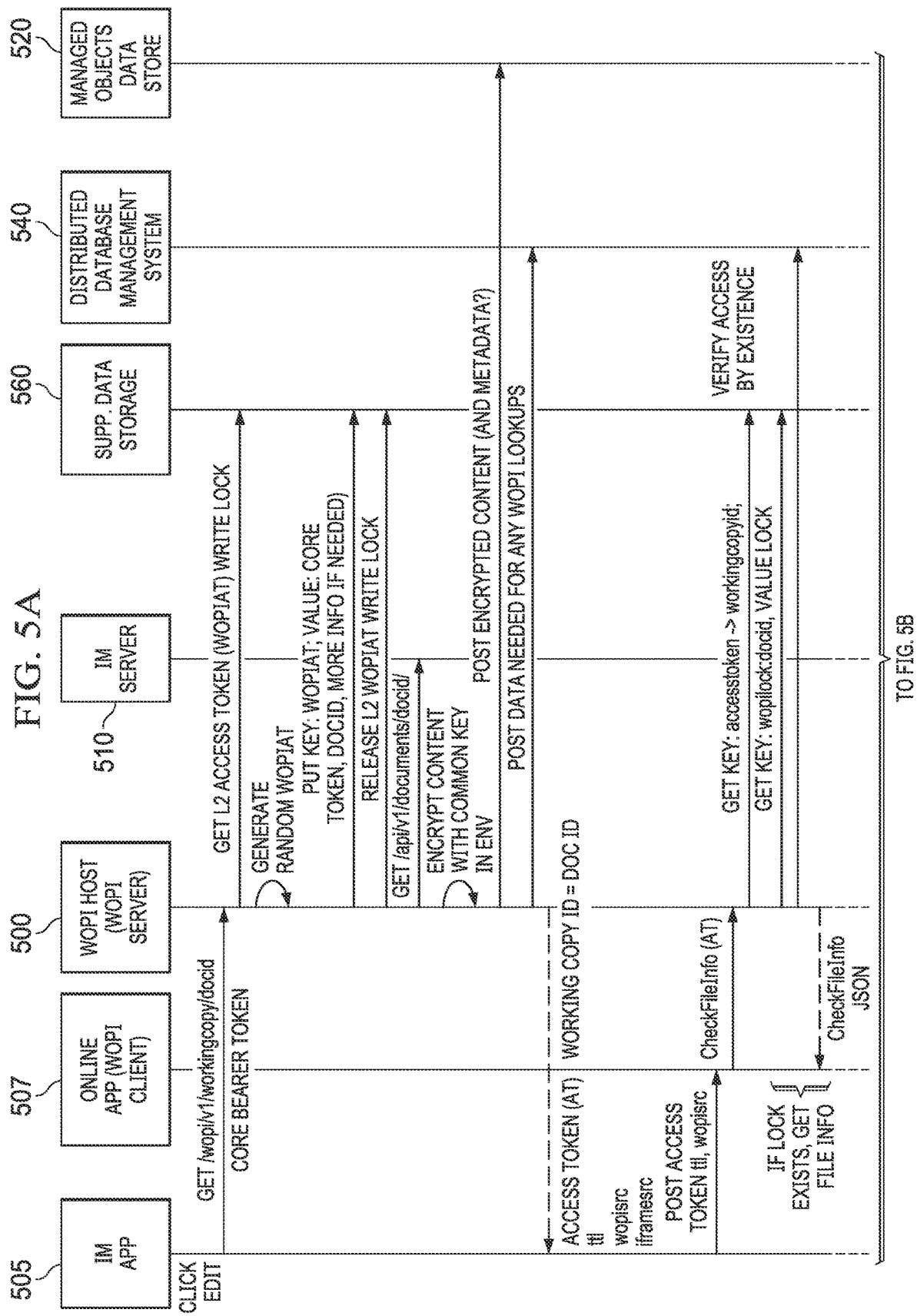

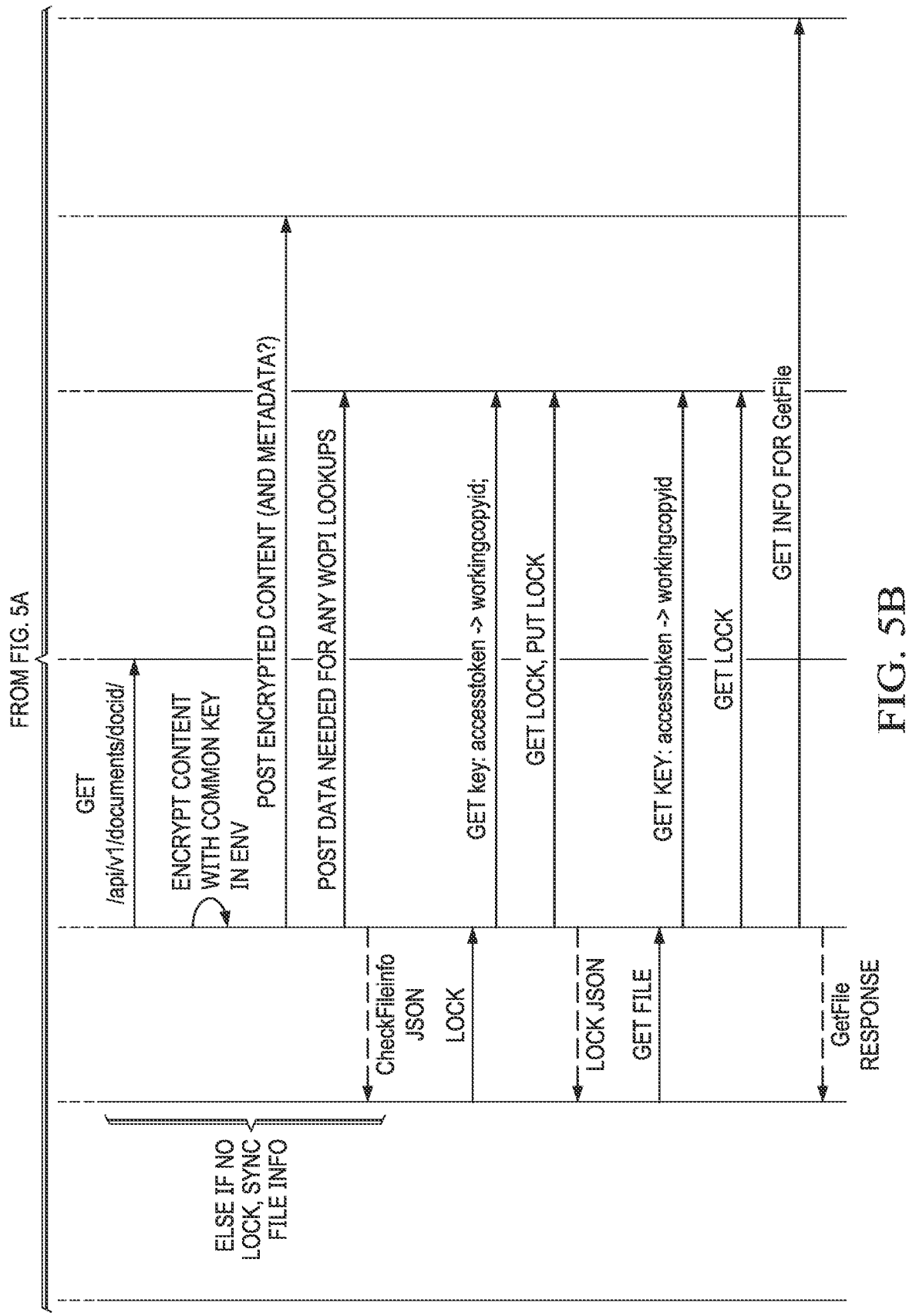

WEB APPLICATION OPEN PLATFORM INTERFACE (WOPI) SERVER ARCHITECTURE AND APPLICATIONS FOR DISTRIBUTED NETWORK COMPUTING ENVIRONMENTS

CROSS-REFERENCE TO RELATED APPLICATION(S)

This application is a continuation of, and claims a benefit of priority under 35 U.S.C. § 120 from, U.S. patent application Ser. No. 16/871,612, filed May 11, 2020, issued as U.S. Pat. No. 11,442,901, entitled WEB APPLICATION OPEN PLATFORM INTERFACE (WOPI) SERVER ARCHITECTURE AND APPLICATIONS FOR DISTRIBUTED NETWORK COMPUTING ENVIRONMENTS," which is a continuation of, and claims a benefit of priority under 35 U.S.C. § 120 from, U.S. patent application Ser. No. 15/884,078, filed Jan. 30, 2018, issued as U.S. Pat. No. 10,671,570, entitled "WEB APPLICATION OPEN PLATFORM INTERFACE (WOPI) SERVER ARCHITECTURE AND APPLICATIONS FOR DISTRIBUTED NETWORK COMPUTING ENVIRONMENTS," which claims a benefit of priority from U.S. Provisional Application No. 62/453,342, filed Feb. 1, 2017, entitled "WEB APPLICATION OPEN PLATFORM INTERFACE (WOPI) SERVER ARCHITECTURE AND APPLICATIONS FOR DISTRIBUTED NETWORK COMPUTING ENVIRONMENTS." All applications listed in this paragraph are fully incorporated by reference herein for all purposes.

TECHNICAL FIELD

This disclosure relates generally to information management systems and services operating in distributed network computing environments. More particularly, this disclosure relates to collaborative file sharing systems and methods for information management systems and services for the World Wide Web. Even more particularly, embodiments disclosed herein relate to a new Web Application Open Platform Interface (WOPI) server architecture useful for collaborative file sharing systems operating in distributed network computing environments.

BACKGROUND OF THE RELATED ART

Web Application Open Platform Interface (WOPI) is a protocol created and published by Microsoft® to allow direct file communication between a WOPI Application (referred to herein as a WOPI App) and a WOPI host (referred to herein as a WOPI Host). WOPI defines a set of operations that enables a client to access, view, and edit files stored by a server. SharePoint 2013 is an example of a WOPI Host.

Today, integrating a cloud-based application, such as an enterprise-grade information management solution or a collaborative file sharing system operating in a distributed network computing environment, with a Microsoft® online application requires putting a WOPI-compliant interface on top of the cloud-based application.

Putting a WOPI-compliant interface on top of the cloud-based application, however, requires the cloud-based application to change behavior and how data is stored including, for example, complying with rules defined by WOPI (and controlled by WOPI's publisher). Such requirements are highly undesirable and essentially restrict performance of the cloud-based application at the discretion of WOPI and/or WOPI's publisher.

In view of the foregoing, what is needed is a technical solution for integrating a cloud-based application with a Microsoft® online application that complies with WOPI requirements without restrictions that may impede the performance of the cloud-based application. The invention described in this disclosure can address this need and more.

SUMMARY OF THE DISCLOSURE

Embodiments disclosed herein provide a new WOPI server architecture that can eliminate restrictions placed on cloud-based applications by WOPI requirements and significantly improve computer performance, particularly in how data is processed and stored by an enterprise-grade information management solution or a collaborative file sharing system operating in a distributed network computing environment.

In some embodiments, the new WOPI server architecture includes a new WOPI Host that can obtain (e.g., sync) a working copy of a managed object (e.g., a document) from a backend server (e.g., an information management server that provides a cloud-based file sharing or any information management service on the Web), unless the managed object is locked; act on the working copy (e.g., delete the working copy, move the working copy to the server (at least) when no valid access tokens exist); introduce access token locks to guard the creation of access tokens while moving working copies to the backend server; and maintain information needed for interacting with a WOPI client (referred to herein as a WOPI Client). When a working copy is submitted to the backend server as a new draft, information concerning the working copy is guaranteed synced with the backend server. The new WOPI Host is fully-compliant with the WOPI specification and can interact with the WOPI Client. However, since the backend server is de-coupled from the WOPI Client, there is no need to change server code, its behavior, and/or how data is stored at the backend. This has a technical effect of freeing the backend server from restrictions imposed by WOPI requirements.

In one embodiment, a system may comprise at least one processor, at least one non-transitory computer-readable storage medium, and stored instructions translatable by the at least one processor to perform a method substantially as described herein. Another embodiment comprises a computer program product having at least one non-transitory computer-readable storage medium storing instructions translatable by at least one processor to perform a method substantially as described herein.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 5A and 5B together depict a sequence of WOPI server operation that illustrates an example of a new online editing process according to some embodiments.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As discussed above, the WOPI protocol allows direct file communication between a WOPI App and a WOPI Host and defines a set of operations that enables a client to access, view, and edit files stored by a server. The WOPI specification is created, published, and controlled by Microsoft®.

One example of how a client might use WOPI is by providing a browser-based viewer for a specific type of file. That client uses WOPI to get the contents of the file and presents that content to a user of the client as a web page in a browser. An example of this process is shown in FIG. 1.

Figure 1:
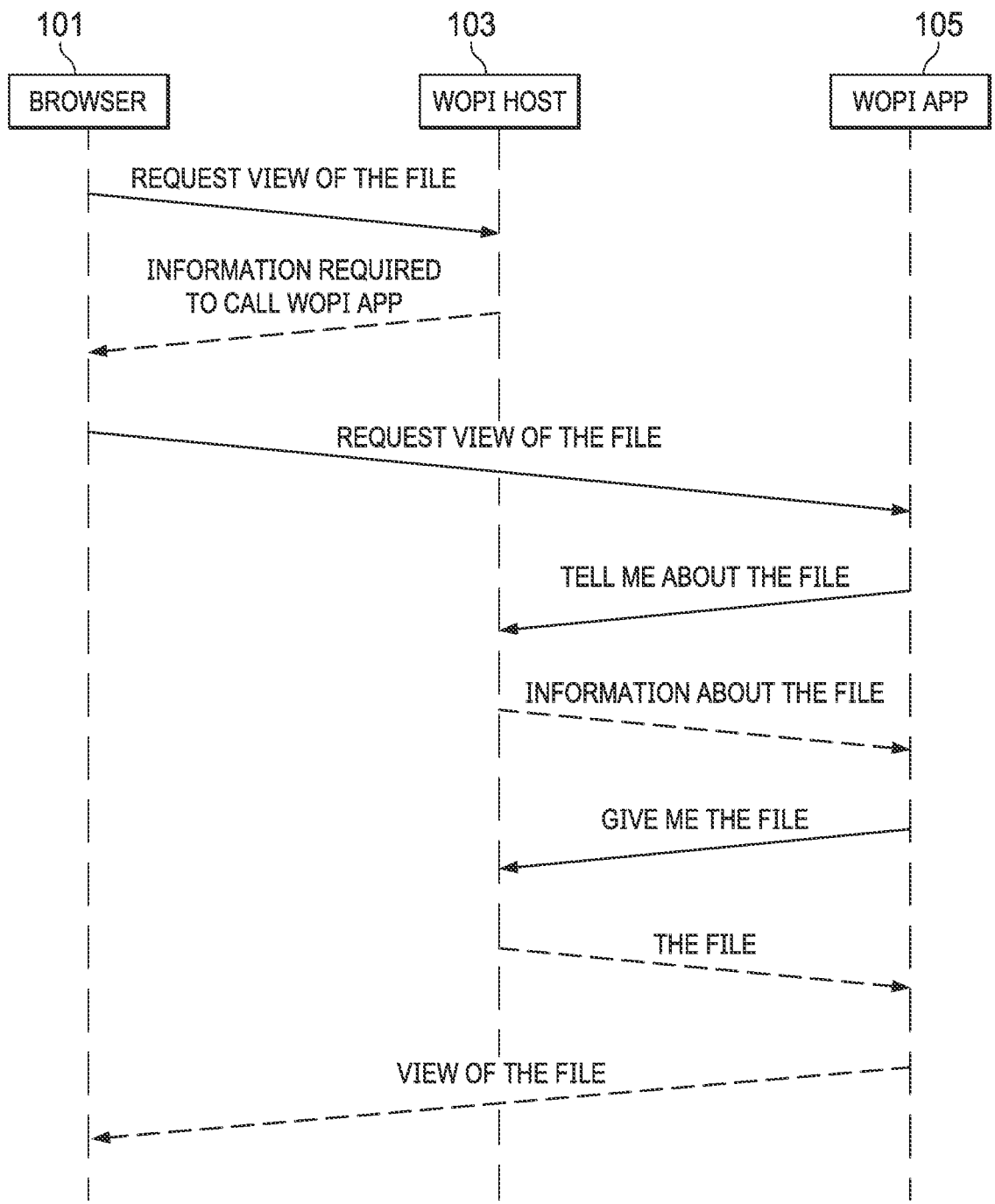
FIG. 1 depicts a diagrammatic representation of an example of using WOPI to provide a browser-based viewer for a specific type of file according to the WOPI specification.

In FIG. 1, a user may, through a browser (e.g., browser 101), initiate a request to view a file (e.g., a document). The browser sends the request to a WOPI Host (e.g., WOPI Host 103). The WOPI Host can query a WOPI App (e.g., WOPI App 105) about its capabilities and learn, in an interactive process called WOPI discovery, what information is needed to call the WOPI App. The WOPI Host can get the necessary information from the browser/user and call the WOPI App with the required information to request a view of the file. The WOPI App may communicate with the WOPI Host (which hosts the actual document) and get information about the file. The WOPI App eventually gets the actual contents of the file and finally renders it so that the client (browser) can view the file. This process allows a client to render files to an end user on a user device and provide the end user with file editing functionality for editing the files thus retrieved.

Technically, WOPI is a protocol that is built on top of the Hyper Text Transfer Protocol (HTTP) and the HTTP Secure (HTTPS). Accordingly, the process shown in FIG. 1 can involve many HTTP(S) calls and responses. Furthermore, requests can be signed and verified to make the process secure. This process and the WOPI protocol in general is known to those skilled in the art and thus are not further described herein.

To integrate a cloud-based application with a Microsoft® ("MS") online application, WOPI requires a WOPI-compliant interface be placed on top of the integrated cloud-based application. OpenText® Core ("Core"), available from Open Text, is an example of a collaborative file sharing system that may leverage MS online applications and that may benefit from the new WOPI server architecture disclosed herein. Although Core is used in this disclosure as an example of an information management system that implements a new WOPI server architecture disclosed herein, skilled artisans appreciate that numerous other implementations of the new WOPI server architecture disclosed herein may also be possible so as to allow a cloud-based file sharing and/or collaboration application to integrate with a Microsoft® online application without having to put a WOP I-compliant interface on top of such an application and/or alter its code and/or behaviors.

Core resides in a cloud computing environment (e.g., OpenText Cloud) and includes a cloud-based file sharing and collaboration application that provides information management services and that offers secure social and collaboration features to end users. With Core, enterprise users and consumer users alike can easily and securely access, perform administrative control, store, share, and work with their files, images, videos, and documents, and so on without needing any involvement from an Information Technology (IT) department. Users can securely and intuitively share, edit, and collaborate on files from various types of networked devices such as desktop computers, mobile devices, smart phones, tablets, laptop computers, etc.

Putting a WOPI-compliant interface on top of Core, however, requires Core to change its behavior and change how it stores data so as to, for example, comply with rules defined by WOPI (and controlled by WOPI's publisher). Such requirements are highly undesirable and essentially restrict performance of Core at the discretion of WOPI (and WOPI's publisher).

To eliminate such restrictions on performance, an object of this disclosure is to decouple Core from WOPI in a way that still allows Core to leverage MS online applications. In some embodiments, this object is realized in a new "Core-friendly" WOPI server, also referred to as an interface server. The new interface server meets the WOPI specification, so it can communicate with a WOPI Client in compliant with WOPI requirements. This allows the interaction between the WOPI Client and a MS online application to remain the same as the WOPI Client is not changed. However, Core is now decoupled from the WOPI Client as the new interface server serves to separate the WOPI protocol from Core. The new interface server defines how data is transferred to and from Core and can act as a proxy that communicates with disparate backend systems.

Figure 2:
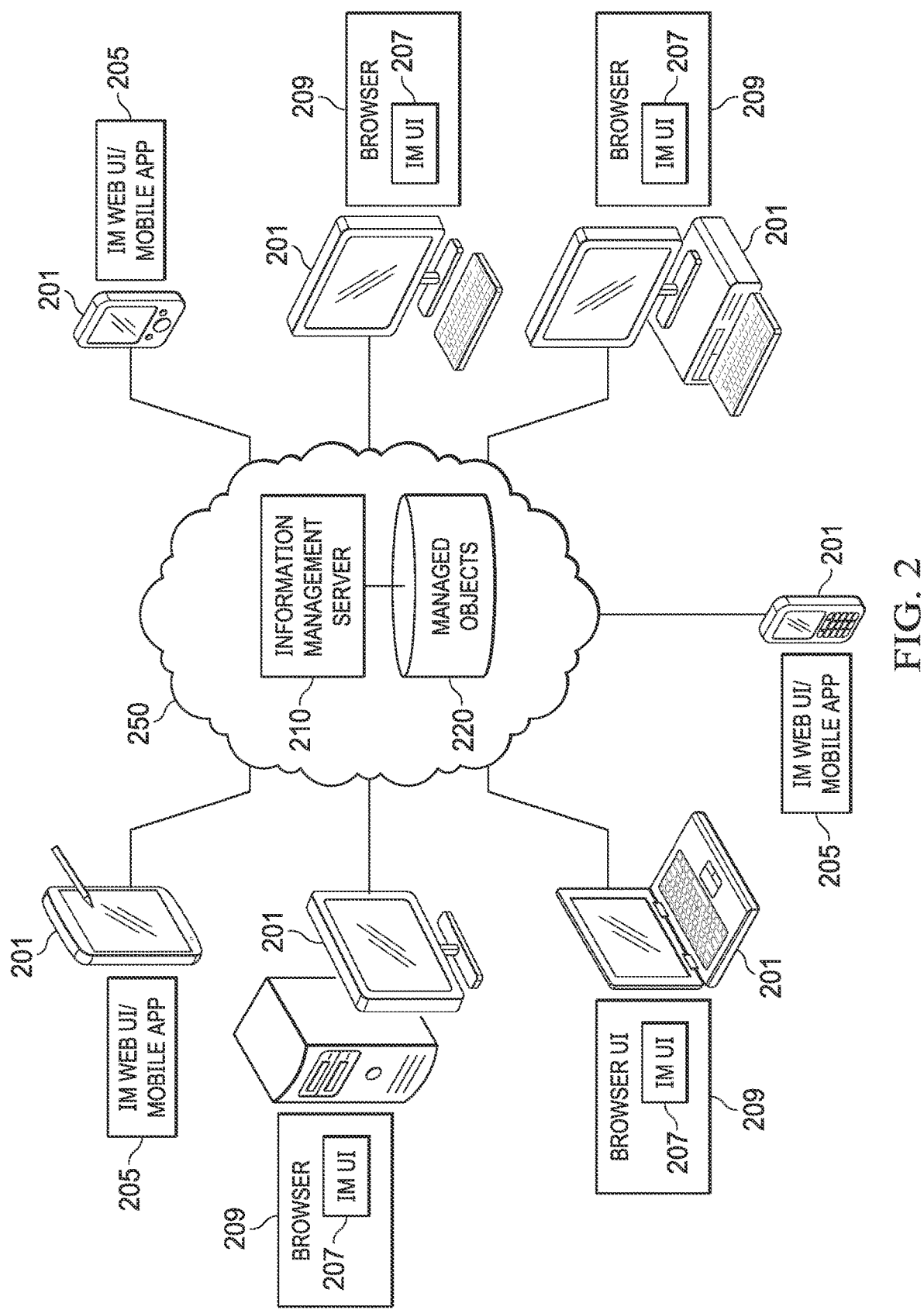
FIG. 2 depicts a diagrammatic representation of an example of a distributed network computing environment in which embodiments disclosed herein can be implemented.

Before describing the new WOPI server system and method in detail, an overview of the underlying information management architecture may be helpful. FIG. 2 depicts a diagrammatic representation of an example of a distributed network computing environment in which embodiments disclosed herein may be implemented.

In the example of FIG. 2, information management ("IM") server 210 such as a Core server resides in cloud computing environment ("Cloud") 250 (e.g., OpenText Cloud). IM server 210 is configured for managing objects ("managed objects") 220. Managed objects may comprise digital assets of a particular enterprise (not shown). Examples of managed objects may include various types of file formats such as texts, documents, logs, messages, emails, images, videos, etc. Managed Objects 220 may reside on at least one suitable non-transitory computer data storage device and are accessible by users with sufficient and appropriate privileges granted by the enterprise and/or its representatives.

As shown in FIG. 2, various types of networked computing devices ("user devices") 201 may be communicatively connected to IM server 210 operating in Cloud 250 over a network (e.g., a private network such as a Local Area Network, a public network such as the Internet, or a combination thereof). Users may securely share file and/or collaborate through IM app 205 or IM user interface ("UI") 207 of IM server 210. IM app 205 may be a mobile application that can be downloaded from an online electronic application store or a Web based UI similar to IM UI 207 that runs in a browser environment (e.g., an instance of browser 209) provided by browser 209.

Figure 3:
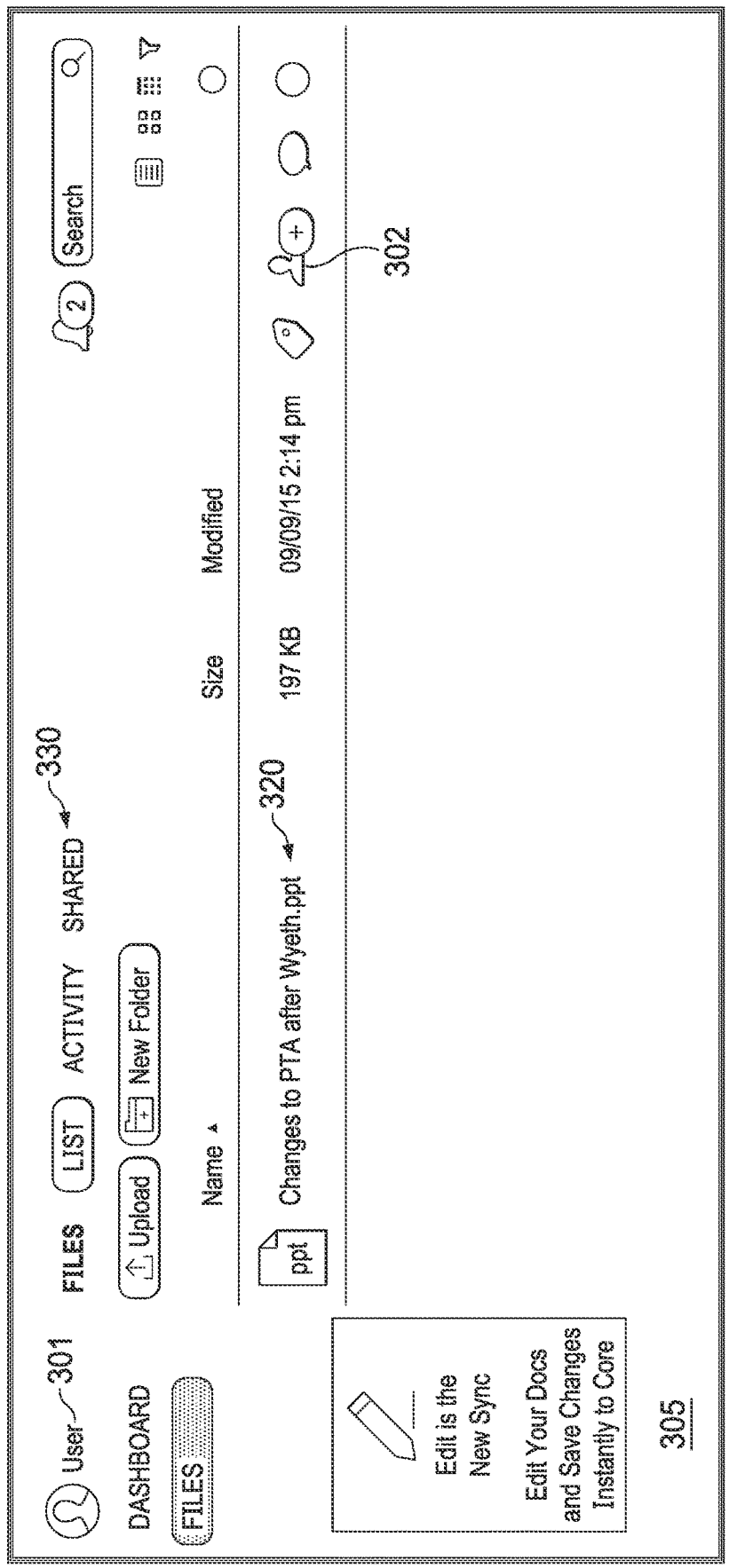
FIG. 3 depicts a diagrammatic representation of a screenshot of an example of a cloud-based file sharing and collaboration application according to some embodiments.

As an example, IM UI 207 or IM app 205 can allow users of user devices 201 to securely share information and/or collaborate on managed object 220 managed by IM server 210. FIG. 3 depicts a diagrammatic representation of a screenshot of an example of IM UI or IM app 305.

In the example of FIG. 3, IM app 305 includes a plurality of functions 330 that allow user 301 to view files—those of user 301 as well as those shared by other(s) with user 301, and view activity/activities by other users relative to those files (e.g., "User X shared a filed Y with you."). User 301 can upload files(s) (e.g., file 320) from their user device(s) to an IM server (e.g., IM server 210) and share the file(s) with another user (e.g., user 302) via IM UI 305. In some cases, when a user selects to open a file from within IM UI 305, for instance, by clicking on file 320 shown in FIG. 3, the instruction (to open the file) is communicated through the browser (which provides the computing environment for IM UI 305) to the operation system and a local call is made by the operating system to open the appropriate software on the user's machine.

Generally, when a user accesses a document managed by Core (more specifically, via a web-based application of Core running in a browser environment on the user's device), the browser operates to get (e.g., download) the document (e.g., a managed object such as managed object 220 from a backend server or Cloud 250) and work with the local operating system to open it in a native application (e.g., a desktop application such as Microsoft Word that is already installed on the user's device) that resides on the local machine. A desktop tray application may act as a local proxy for Core and maintain the session with Core for both the browser and the native application. The downloaded document is stored in a local file system under the control of a web server (which can be implemented as a cloud service, on the user's device, or on a server machine) and sync'd (e.g., upload back to the backend server or Cloud 250) when the session ends. In some embodiments, this web server comprises the new "Core-friendly" WOPI server, also referred to herein as a new WOPI Host.

Figure 4:
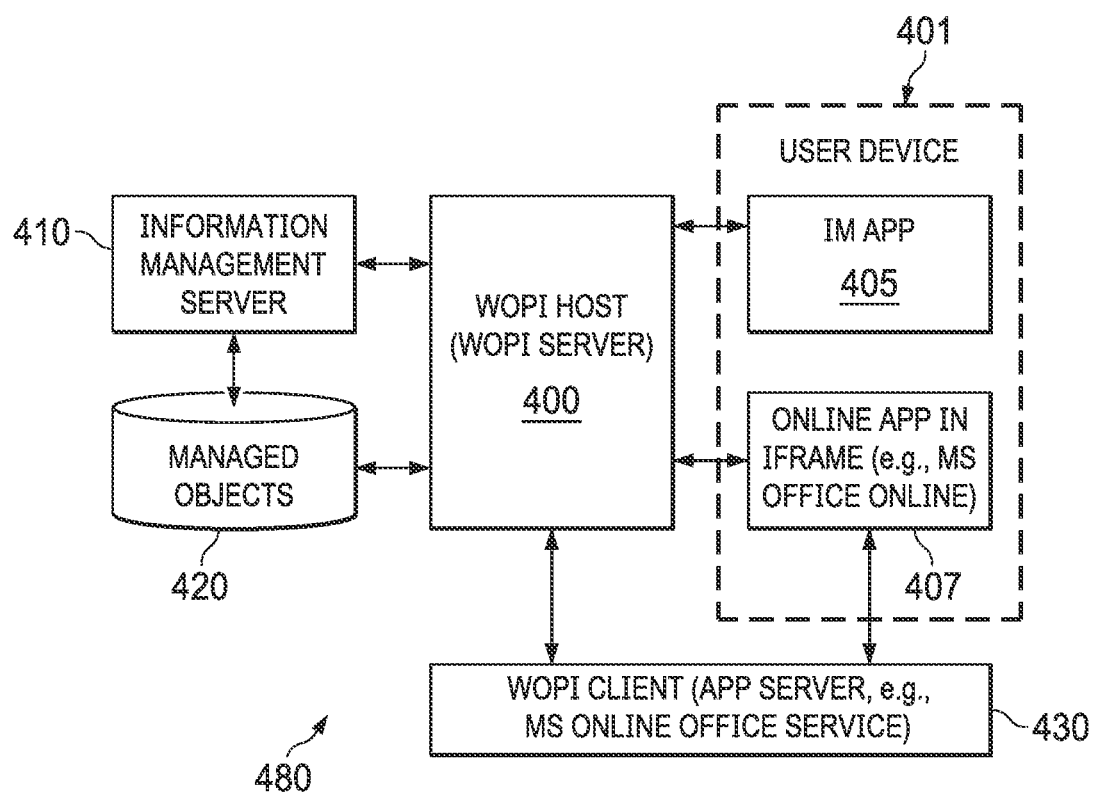
FIG. 4 depicts a flow diagram illustrating an example of operation of a new WOPI server according to some embodiments.

FIG. 4 depicts a flow diagram illustrating an example operation of system architecture 480 with WOPI Host 400 according to some embodiments. In the example embodiments, IM server 410 may manage objects 420 stored in a repository at the backend and provide a new "online edit" feature through IM app 405 that allows users to edit managed objects 420 using a MS online application such as Office Online, Word Online, Excel Online, PowerPoint Online, OneNote Online, etc. that runs inside iframe 407 on user device 401. For example, in some embodiments, when a user clicking on an "edit" or "new" button in a UI of IM app 405, the button may change into a menu containing a set of options such as desktop and/or online applications may be displayed and the user can select an appropriate application to use from the menu.

An iframe or "inline frame" generally refers to an independent HyperText Markup Language (HTML) document embedded inside another HTML document which can be, for example, a surrounding page on a website or an application created according to the HTML5 Web standard. HTML5 or Web applications can be compatible with mobile devices (e.g., smartphones running on an iOS or Android operating system), but can also be compatible with browsers running on desktop computers, laptop computers, notebook computers, etc. An iframe can be configured with its own functionality such as scrollbar independent of another page or Web app's functionality.

FIG. 4 shows IM app 405 and iframe 407 in two separate functional blocks to reflect their independence in functionality. In some embodiments, iframe 407 is embedded in IM app 405 when IM app 405 is implemented as an instance of a browser. In these cases, IM app 405 represents an example of a page that can surround iframe 407 at runtime on user device 401. IM app 405 may contain configuration iframe information (e.g., a universal resource locator to a WOPI Client such as application server 430, time to live, etc.). However, iframe 407 is populated by the online application (which is a client of application server 430) that runs inside of iframe 407. As an example, the online application can be a Web UI of Office Online. In some embodiments, iframe 407 need not be embedded in IM app 405 when IM app 405 is implemented as a Web application (e.g., one that does not require a browser to run). In these cases, IM app 405 may hand off configuration information to iframe 407 (e.g., by calling its elements) instead of embedding iframe 407 code and passing parameters through the embedded code.

As FIG. 4 illustrates, IM app 405 is a client of IM server 410 and communicates with IM server 410 by way of WOPI Host 400. In some embodiments, WOPI Host 400 can operate as a cloud service or a web server for IM server 410. The online application running in iframe 407, however, is hosted by application server 430 and delivered by way of iframe 407 to user device 401 as services. Skilled artisans appreciate that this service delivery process implements the software as a service (SaaS) software licensing and delivery model. Application server 430 resides in the MS computing environment external to IM server 410 and to user device 401 and operates independently of IM server 410. Application server 430 operates as a client of WOPI Host 400 and thus is also referred to herein as WOPI Client 430.

When a user wants to edit a document displayed in iframe 407 by the online application (which is hosted by application server 430) on user device 401, a request is communicated to WOPI Host 400 via iframe 407. WOPI Host 400 operates to obtain the document (which is a managed object 420 managed by IM server 410 in the example of FIG. 4) from IM server 410 and open a working copy of the document through the online application running in iframe 407 on user device 401. This process is further described below.

FIGS. 5A and 5B together depict a sequence of WOPI server operation that illustrates an example of a new online editing process enabled by the new WOPI server (e.g., WOPI Host 500) according to some embodiments. As an example, when a user selects an online edit function of an IM application (e.g., IM app 505, which can be an embodiment of IM UI 305 or IM app 405) to create a new document or modify an existing document, an appropriate online application (e.g., hosted by WOPI Client 507) may be launched and populated (e.g., in an iframe such as iframe 407 as described above). Additionally, a discovery process may be triggered for the WOPI server to learn from an IM server (e.g., IM server 510) what information may be needed to create or open the document requested by the user, which is managed or to be managed by the IM server (e.g., through distributed database management system 540 such as Casandra to query managed objects stored in managed objects data store 520). This process may involve using a document identifier (e.g., "GET/wopi/v1/workingcopy/docid") associated with the document and an access token (e.g., "Core Bearer Token"). To this end, the WOPI server may check a supplemental data store (e.g., supplemental data storage 560) and determine whether a WOPI access token is stored there. In some embodiments, this supplemental data storage, which supplements the IM server's primary data storage, Casandra, may be implemented in many ways, for instance, as an in-memory data structure using Redis. Redis and Casandra are known to those skilled in the art and thus are not further described herein.

In some embodiments, each WOPI access token (WOPIAT) has a lock (e.g., WOPIAT Write Lock). If no WOPI access token is in the supplemental data storage, a new one is randomly generated and stored in memory. The WOPI Host passes or handoff the learned information (e.g., the document identifier, authentication token, or any other parameters) to the online application server (the WOPI Client). The WOPI Client calls the IM server with the required parameters. In some embodiments, the WOPI Host may receive the call from the WOPI Client and pipe the call to the IM server. The IM server fetches the requested document (e.g., from a managed objects data store) or creates one (if a new document is requested), makes a working copy, and communicates (e.g., pushes) it to the WOPI Host. The WOPI Host hosts the working copy for the WOPI Client and the WOPI Client operates to display the working copy on the user device via its client, the online application.

Unlike conventional WOPI Hosts, the new WOPI Host operates as a proxy server for the backend IM server. This allows the IM server to operate independently of the WOPI requirements and be de-coupled from having to interface with the online application. A technical effect here is that this separation can improve the performance of the IM server because it no longer has to be so frequently sync'd with user devices at the frontend. For example, even when a user device that is communicatively connected to the IM server is idling, a draft may be continuously automatically sync'd to and saved at the backend by the IM server (e.g., every few seconds). Multiply the number of drafts each user device may sync with the IM server at any given time with the number of user devices communicatively connected to the IM server, this constant syncing can affect the IM server's performance. The new WOPI Host system disclosed herein can alleviate this burden placed on the IM server by saving working copies (there can be multiple working copies for a single document) locally at the WOPI Host layer and, when work on the underlying document is done, a single work copy is sync'd to the backend and stored as a draft of the document (e.g., in a networked file system at the server side).

In some embodiments, the drafts that are saved by the WOPI Host at the WOPI Host layer are referred to as working copies because they are being worked on in the online application, to distinguish from the drafts saved by the IM server at the backend. As illustrated in FIGS. 5A-5B, the new WOPI Host is operable to obtain (e.g., via a sync operation) a working copy of the document from the backend for the online application, unless the document is locked. When the document is locked, that means a working copy already exists, as explained below with reference to FIG. 6. So, to prevent the existing working copy from being modified when the document is locked, no new work copy can be created from the document again by the WOPI Host.

If the requested document is not already locked by the WOPI Host (i.e., no working copy is currently in use), the WOPI Host may interact with the IM server to obtain a working copy of the document and provide same to the online application (through the WOPI Client which hosts the online application). The WOPI Host may call the IM server as needed to process WOPI Rest API (application programming interface) functions. In some embodiments, when serving as a proxy for the IM server, the WOPI Host may act on the working copy, for instance, moving the working copy to the managed objects data store when all WOPI accesses are done or when no valid access tokens exist.

The WOPI Host implements WOPI access token locks to guard the creation of access tokens while moving working copies to the backend. When a working copy is submitted as a new draft to the backend IM server, information concerning the working copy (e.g., draft metadata) is guaranteed synced with the backend IM server. The WOPI Host can maintain information (e.g., in its local data storage) necessary to interact with the WOPI Client and is fully-compliant with the WOPI specification.

Figure 6:
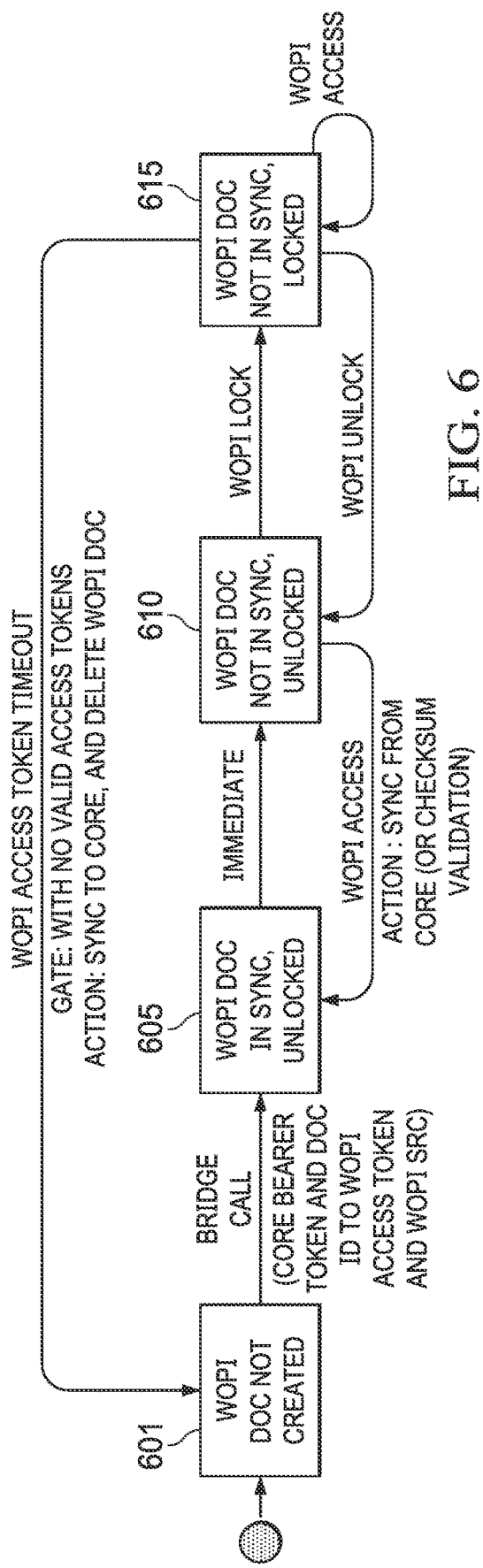
FIG. 6 depicts a sync state diagram further exemplifying the locking mechanism implemented by the new WOPI server according to some embodiments.

FIG. 6 depicts a sync state diagram further exemplifying the locking mechanism implemented by the new WOPI Host according to some embodiments. A goal of the new WOPI Host is to shield the IM server at the backend so that the lock semantics inside the IM server code do not need to be modified to meet the WOPI requirements. To achieve this goal, the WOPI Host implements the lock mechanism of the WOPI specification needed to interface with the WOPI Client. In order to do so, the WOPI Host has to have its own working copies so that the WOPI Host is not changing the lock semantics inside the IM server code. This presents several issues, for instance, how working copies should be stored, and how the IM server APIs can be used to store the working copies. FIG. 6 illustrates the notion of a "WOPI Doc" with a particular locking mechanism that addresses these issues.

In the example of FIG. 6, a "WOPI Doc" is a working copy that is locally stored at a place that the WOPI Host has control over. In an example implementation, depending upon the actor, an electronic file for a document may be referred to as a draft (when it is under the control of the IM server), a working copy (when it is being worked on in the online application and/or hosted by the WOPI Host), or a WOPI Doc (when the WOPI Host implements the WOPI locking mechanism on it and utilizes the IM server as a storage mechanism to store it).

At state 601, there is no working copy yet, so there is no WOPI Doc. The locking mechanism may transition to state 605 when a request comes in which calls the WOPI server to get a working copy. At state 605, that working copy is considered in sync (when it is created) with the actual document managed by the IM server at the backend. However, the locking mechanism may transition to state 610 immediately to reflect the possibility that some other user has updated the document. At state 610, the WOPI Doc is not in sync with the document and is not locked. If there is any WOPI access to that document and it's not yet locked, it is sync'd and the locking mechanism transitions back to state 605. This loop continues until a lock is applied and the WOPI Doc is locked, at which time, the locking mechanism transitions to state 615. As soon as the WOPI Doc is locked, the WOPI Host works only with the (locked, but out of sync) working copy. The WOPI Doc is locked at this state until an actual unlock request comes in which moves the locking mechanism back to the unlock state (state 610). Any WOPI access will work with the WOPI Doc when it is locked (state 615). So, all the WOPI editing can happen on the working copy at this state. Once the WOPI accesses to the working copy are done, the locking mechanism transitions back to state 601. During this transition, the working copy is sync'd to the IM server to create a new object and the working copy itself is deleted.

According to the WOPI specification, the locking mechanism implements a WOPI access token timeout. In this way, if a user device has been idling for some time, say, 20 minutes, a message may appear on the user device in the online application, notifying the user that access to the document has expired (timed out). The user may be asked to refresh and request for access again. In some cases, it may be that all access tokens have timed out. When this condition (gate) is reached, the WOPI session is done, which signals the beginning of the storing process (e.g., syncing the latest working copy to the IM server for storage as a version to be stored at the backend).

Figure 7:
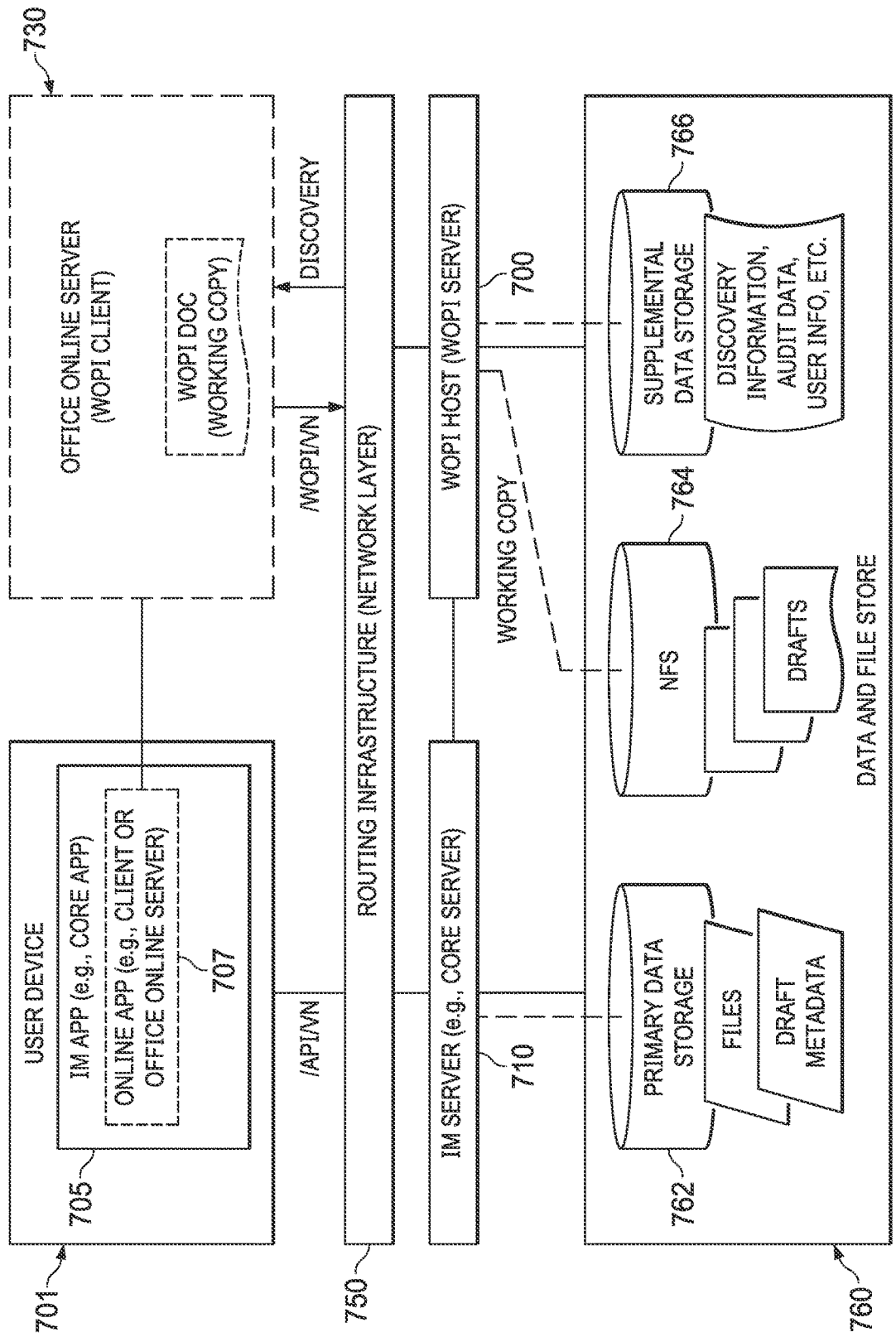
FIG. 7 depicts a diagrammatic representation of an example of a system architecture comprising a new WOPI server according to some embodiments.

FIG. 7 depicts a diagrammatic representation of an example of system 780 comprising a WOPI Host according to some embodiments. Components of system 780 can be similar to components of system 480 described above with reference to FIG. 4. For example, user device 701 can be an example of user device 401, office online server 730 can be an example of application server 430, IM app 705 can be an example of IM app 405, online app 707 can be an example of the online application running in iframe 407, IM server 710 can be an example of IM server 410, and WOPI Host 700 can be an example of WOPI Host 400 described above.

In the example of FIG. 7, IM app 705 may communicate with IM server 710 without having to go through WOPI Host 700. Routing infrastructure 750 is configured for routing a request or call based on format of the request or call.

When a user selects a button or indicates a wish to create, open, or edit a document in IM app 705 and selects an online application (e.g., online app 707) to open or create a document managed by IM server 710, IM app 705 (or the browser running IM app 705) may operate to retrieve resource information (e.g., a file list) from IM server 710, determine whether the resource information can be edited, and use data about online app 707 collected by WOPI Host 700 to populate the iframe within which online app 707 is run.

During this process, parameters such as a document identifier and an IM server authentication token may also be obtained by IM app 705 from the backend (e.g., from WOPI Host 700). These parameters are passed by IM app 705 in a client call by online app 707 to its server, which, in the example, is office online server 730.

Office online server 730, which is a client (WOPI Client) of WOPI Host (WOPI Server) 700, in turn, calls WOPI Host 700 (or, technically, routing infrastructure 750). The call is routed by routing infrastructure 750 to WOPI Host 700. WOPI Host 700 can operate to obtain a working copy from IM server 710 as described above.

Both WOPI Host 700 and IM server 710 are communicatively connected to data and file store layer 760. Primary data storage 762 stores managed objects and draft metadata for IM server 710. Drafts (e.g., the most up-to-date working copies) are cached and stored by WOPI Host 700 in networked file system (NFS) 764. Supplemental data storage 766 may store any information needed by WOPI Host 700. Such information may be collected by WOPI Host 700 in various ways and/or at different times (e.g., when WOPI Host 700 first starts up and/or by pulling office online server 730 at a predetermined interval). As shown in FIG. 7, office online server 730 may provide updates or whole files to WOPI Host 700 or WOPI Host 700 may initiate a discovery process to obtain information from office online server 730. The information collected by WOPI Host 700 can be stored in a file (e.g., an Extensible Markup Language (XML) document) and may include discovery information, audit information, WOPI access tokens, and so on.

In operation, IM server 710 may fetch a document (e.g., one that is requested by the user through IM app 705) from primary data storage 762, makes a copy, and provides the copy to WOPI Host 700. WOPI Host 700 may implement a locking mechanism on the working copy and creates a WOPI Doc as described above with reference to FIG. 6. The WOPI Doc, as described above, is another working copy of the same document requested by the user, but is under control of WOPI Host 700. The working copy is provided by WOPI Host 700 to its client (WOPI Client 730), which provides the working copy to its client (online app 707), which displays it on user device 701. In some embodiments, WOPI Client 730 may cache a copy of the document that its client (online app 707) is working on. In some embodiments, WOPI Host 700 may host and keep the most up-to-date version of the working copy. Such working copies can reflect varying versions of the same document involved in the online editing process, while the original document is stored in primary data storage 762 and locked from editing.

When the work is done (e.g., when the user selects "save" or closes online app 707 or IM app 705), the working copy is sync'd back from online app 707 to WOPI Client 730, then from WOPI Client 730 to WOPI Host 700. WOPI Host 700 may perform some cleanup operations as described above with reference to FIGS. 5A-6 and communicate to IM server 710 that it has a new copy of the document. In turn, IM server 710 may either save the new copy of the document as a new draft or replace the stored document with the new draft in primary data storage 762. Metadata for the newly draft may be extracted and stored in primary data storage 762 by IM server 710. As this process illustrates, operations and performance of IM server 710 at the backend are not affected or otherwise restricted by WOPI requirements.

Skilled artisans appreciate that data and file store layer 760 may be implemented in many ways and may utilize various storage mechanisms and systems. For example, in addition to in-memory data structures and distributed database systems described above, object-relational database systems may also be implemented.

Figure 8:
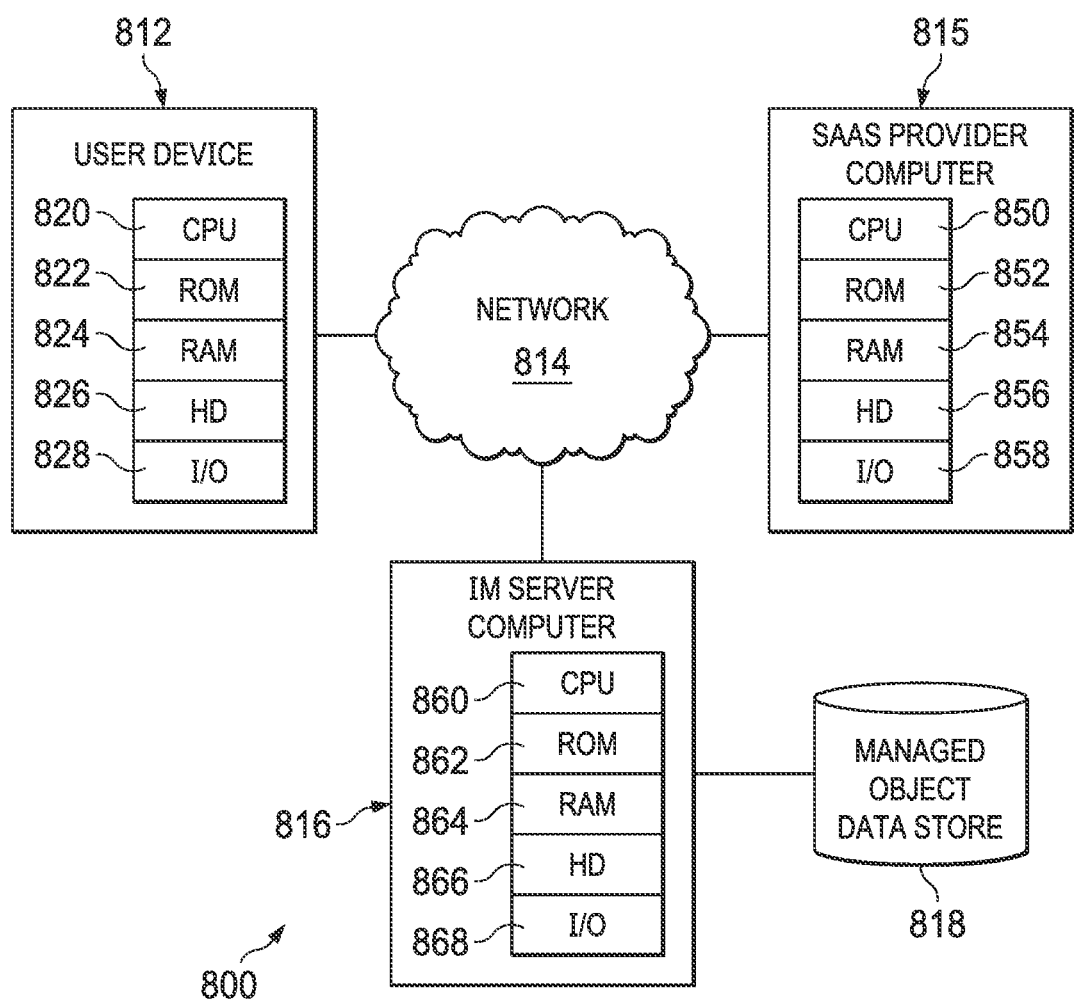
FIG. 8 depicts a diagrammatic representation of an example of distributed network computing environment where embodiments disclosed can be implemented.

FIG. 8 depicts a diagrammatic representation of an example of an enterprise network computing environment where embodiments disclosed can be implemented. In the example illustrated, network computing environment 800 includes network 814 that can be bi-directionally coupled to user devices 812, SaaS provider computer 815, and IM server computer 816. IM server computer 816 can be bi-directionally coupled to managed object data store 818. Network 814 may represent a combination of wired and wireless networks that network computing environment 800 may utilize for various types of network communications known to those skilled in the art.

For the purpose of illustration, a single system is shown for each user device 812, SaaS provider computer 815, and IM server computer 816. However, within each of user device 812, SaaS provider computer 815, and IM server computer 816, a plurality of networked devices and computers alike (not shown) may be interconnected to each other over network 814. For example, a plurality of user devices 812 and a plurality of SAAS provider computers 815 may be coupled to network 814. User devices 812 may include data processing systems for communicating with IM server computer 816.

User device 812 can include central processing unit ("CPU") 820, read-only memory ("ROM") 822, random access memory ("RAM") 824, hard drive ("HD") or storage memory 826, and input/output device(s) ("I/O") 828. I/O 828 can include a keyboard, monitor, printer, electronic pointing device (e.g., mouse, trackball, stylus, etc.), or the like. User device 812 can include a desktop computer, a laptop computer, a personal digital assistant, a cellular phone, or nearly any network-enabled device capable of communicating over a network. SAAS provider computer 815 may be similar to user computer 812 and can comprise CPU 850, ROM 852, RAM 854, HD 856, and I/O 858.

Likewise, IM server computer 816 may include CPU 860, ROM 862, RAM 864, HD 866, and I/O 868. IM server computer 816 may include one or more backend systems configured for providing a variety of IM services to user devices 812 over network 814. Managed object data store 818 may comprise at least one data storage device storing managed objects in a repository managed by IM server computer 816. Many other alternative configurations are possible and known to skilled artisans.

Each of the computers in FIG. 8 may have more than one CPU, ROM, RAM, HD, I/O, or other hardware components. For the sake of brevity, each computer is illustrated as having one of each of the hardware components, even if more than one is used. Each of computers 812, 815, and 816 is an example of a data processing system. ROM 822, 852, and 862; RAM 824, 854, and 864; HD 826, 856, and 866; and data store 818 can include media that can be read by CPU 820, 850, or 860. Therefore, these types of memories include non-transitory computer-readable storage media. These memories may be internal or external to computers 812, 815, or 816.

Portions of the methods described herein may be implemented in suitable software code that may reside within ROM 822, 852, or 862; RAM 824, 854, or 864; or HD 826, 856, or 866. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the invention should be determined by the following claims and their legal equivalents.

What is claimed is:

1. A method, comprising:
   at a device, receiving a request to open or create a document in an online application, the document managed by an information management (IM) server communicatively connected to a device over a network;
   obtaining an authentication token from a Web Application Open Platform Interface (WOPI) server;
   passing at least a document identifier for the document and the authentication token from the WOPI server to an online application server, wherein the online application server is a WOPI client of the WOPI server and wherein the online application server calls the WOPI server with the document identifier for the document and with the authentication token from the WOPI server;

obtaining, by the WOPI server, a working copy of the document from the IM server; and providing, by the WOPI server, the working copy of the document to the WOPI client, wherein the WOPI client provides the working copy to the online application.

2. The method according to claim 1, wherein the request to open or create a document is received by an IM application running on the device, wherein the IM application is a client application of the IM server, and wherein the launching is performed by the IM application and results in the online application running in an inline frame within the IM application on the device.

3. The method according to claim 1, wherein the request to open or create a document is received by an IM application running in a browser application on the device, wherein the IM application is a client application of the IM server, and wherein the launching is performed by the IM application and results in the online application running in an inline frame within the IM application that runs within the browser application on the device.

4. The method according to claim 1, wherein the WOPI server implements a WOPI locking mechanism and wherein the IM server implements a locking mechanism that is different from the WOPI locking mechanism.

5. The method according to claim 1, wherein the WOPI server resides on the device or a server machine.

6. The method according to claim 1, wherein the WOPI server operates as a cloud service or a proxy server for the IM server.

7. The method according to claim 1, further comprising:

receiving an indication from the device to close or save the working copy of the document;

syncing the working copy of the document to the IM server, wherein the IM server stores the working copy of the document as a draft in a networked file system; and deleting the working copy, the deleting performed by the WOPI Host.

8. A system, comprising:

an information management (IM) server computer communicatively connected to a repository and to a device, wherein the repository stores managed objects, wherein the device receives a request to open or create a document in an online application, wherein the document is stored in the repository and managed by the IM server, and wherein the online application is hosted by an online application server; and a Web Application Open Platform Interface (WOPI) server computer communicatively connected to the IM server and to the online application server, wherein the online application server is a WOPI client of the WOPI server, wherein the WOPI client calls the WOPI server for the document, wherein the WOPI server is configured for obtaining a working copy of the document from the IM server and providing the working copy of the document to the WOPI client.

9. The system of claim 8, wherein the request to open or create a document is received by an IM application running on the device, wherein the IM application is a client application of the IM server, and wherein the online application runs in an inline frame within the IM application on the device.

10. The system of claim 8, wherein the request to open or create a document is received by an IM application running in a browser application on the device, wherein the IM application is a client application of the IM server, and wherein the online application runs in an inline frame within the IM application that runs within the browser application on the device.

11. The system of claim 8, wherein the WOPI server implements a WOPI locking mechanism and wherein the IM server implements a locking mechanism that is different from the WOPI locking mechanism.

12. The system of claim 8, wherein the WOPI server resides on the device or a server machine.

13. The system of claim 8, wherein the WOPI server operates as a cloud service or a proxy server for the IM server.

14. A computer program product comprising a non-transitory computer-readable medium storing instructions translatable by a Web Application Open Platform Interface (WOPI) server for:

responsive to a request to open a document in an online application determining whether the document is locked by the WOPI server;

responsive to the document not being locked, obtaining a working copy of the document from the IM server, storing a copy of the working copy in a storage that is local to and controlled by the WOPI server, locking the copy, and providing the working copy to the online application through a WOPI Client;

responsive to the document being locked, an update to the working copy is communicated to the WOPI server by the WOPI Client which hosts the online application, wherein the working copy is sync'd back from the WOPI Client to the WOPI server responsive to saving or closing the document; and communicating the working copy sync'd back from the WOPI Client to the IM server as the new copy of the document, wherein the IM server saves the new copy as a new draft of the document or replaces the document with the new copy.

15. The computer program product of claim 14, wherein the request to open a document is received by an IM application running on the device, wherein the IM application is a client application of the IM server, and wherein the online application runs in an inline frame within the IM application on the device.

16. The computer program product of claim 14, wherein the request to open a document is received by an IM application running in a browser application on the device, wherein the IM application is a client application of the IM server, and wherein the online application runs in an inline frame within the IM application that runs within the browser application on the device.

17. The computer program product of claim 14, wherein the non-transitory computer-readable medium stores further instructions translatable by the WOPI server for initiating a discovery process to learn from the IM server information needed to open the document requested.

18. The computer program product of claim 17, wherein the information learned from the IM server comprises a document identifier associated with the document and an access token.

19. The computer program product of claim 18, wherein the non-transitory computer-readable medium stores further instructions translatable by the WOPI server for determining whether the access token is stored in a data store local to the WOPI server.

20. The computer program product of claim 14, wherein the non-transitory computer-readable medium stores further instructions translatable by the WOPI server for deleting the working copy sync'd back from the WOPI Client.

\* \* \* \* \*